United States Patent [19]
Junkers et al.

[11] Patent Number: 5,406,867
[45] Date of Patent: Apr. 18, 1995

[54] MECHANICAL TENSIONER

[75] Inventors: John K. Junkers, Saddle River, N.J.; Peter Koppenhoefer, Portland, Pa.

[73] Assignee: Unex Corporation, South Hackensack, N.J.

[21] Appl. No.: 78,422

[22] Filed: Jun. 16, 1993

[51] Int. Cl.$^6$ .............................................. B25B 29/02
[52] U.S. Cl. .................................................. 81/57.38
[58] Field of Search ............... 81/57.38, 57.14, 57.3; 254/29 A

[56] References Cited

U.S. PATENT DOCUMENTS

| | | | |
|---|---|---|---|
| 4,246,810 | 1/1981 | Keske | 21/57.38 |
| 4,314,690 | 2/1982 | Mlynarik et al. | 81/57.38 X |
| 4,535,656 | 8/1985 | Orban | 81/57.38 |
| 4,998,453 | 3/1991 | Walton et al. | 81/57.38 |

Primary Examiner—D. S. Meislin
Attorney, Agent, or Firm—Michael J. Striker

[57] ABSTRACT

A mechanical tensioner for a nut-bolt assembly has two input elements engaging with one another and engageable by an actuating tool so that the input elements are turnable relative to one another in opposite directions, one of the input elements being engageable with a bolt so that when the input elements are turned relative to one another the one engaging element pulls the bolt in an axial direction, an output element engageable with a nut so as to turn the nut, and a transmission connecting the other input element with the output element so that when the other input element is turned the output element turns through the transmission and thereby turns the nut. The transmission is formed so that the output element is turnable with a speed which is substantially greater than a speed of turning of the other input element.

5 Claims, 4 Drawing Sheets

MECHANICAL TENSIONER

BACKGROUND OF THE INVENTION

The present invention generally relates to mechanical tensioners.

In particular, it relates to a mechanical tensioner for tensioning threaded connectors for example a nut and bolt assembly, which does not remain on an application once the nut is tightened and which is removed.

In industry tensioners are known which use hydraulics to elongate a bolt. They basically include a hydraulic jack that reacts on a sleeve around the nut and that is connected to the stud portion which sticks out over the nut. An oval opening in, the sleeve lets the operator turn the nut down once the stud is elongated by means of a pin which connects the holes in the side of the nut. There is also one system which instead of having an oval opening in the sleeve, has a gear mechanism that is being turned once the elongation of the stud has been achieved so as to exert more force when turning the nut. The one feature which all these tensioners have in common is that they do not turn the nut down strong enough so as to avoid stud relaxation once the tensioner is taken off.

SUMMARY OF THE INVENTION

Accordingly, it is an object of the present invention to provide a mechanical tensioner which avoids the disadvantages of the prior art.

In keeping with these objects and with others which will become apparent hereinafter, one feature of the present invention resides, briefly stated, in a mechanical tensioner for tensioning a nut-bolt assembly, which has two input elements which are engageable by a tool to be turned in opposite directions, one of the input elements being engageable with a bolt so that during turning the input elements in two opposite directions, the one input element does not turn but instead pull the bolt; an output element engageable with a nut so as to turn the nut; and a transmission connecting the other input element with the output element so that when the other input element is turned it turns the output element through the transmission and thereby turns the nut, the transmission being formed so that the output element turns faster than the other input element.

When the mechanical tensioner is designed in accordance with the present invention it avoids the disadvantages of the prior art. A significantly higher degree of tensioning is achieved, and it eliminates bolt relaxation after the tensioner is taken off. At the same time, the tensioner can be operated with a regular hydraulic torque tool.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
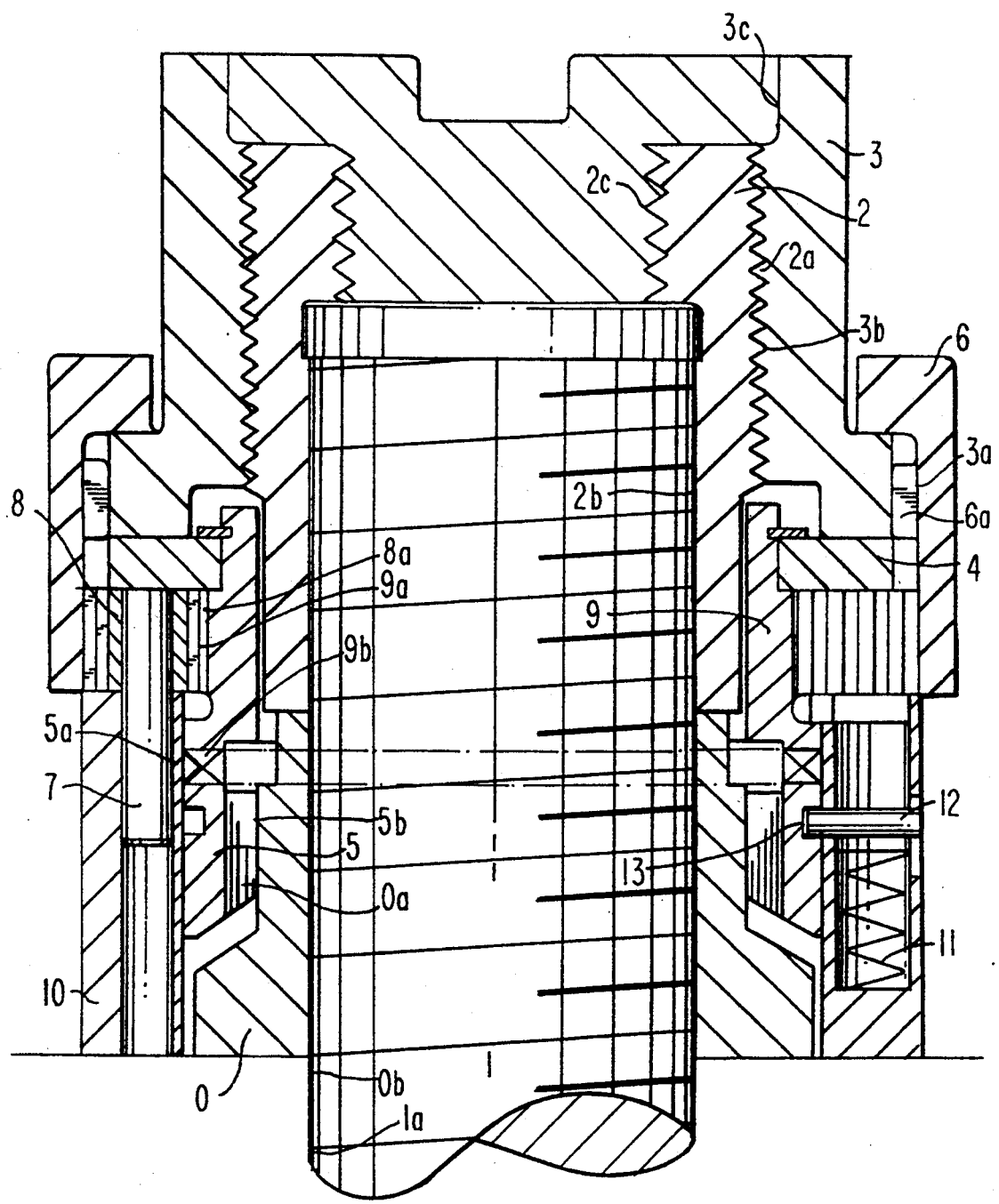
FIG. 1 is a view showing a mechanical tensioner in accordance with the present invention applied to a nut-bolt assembly.
Figure 2A:
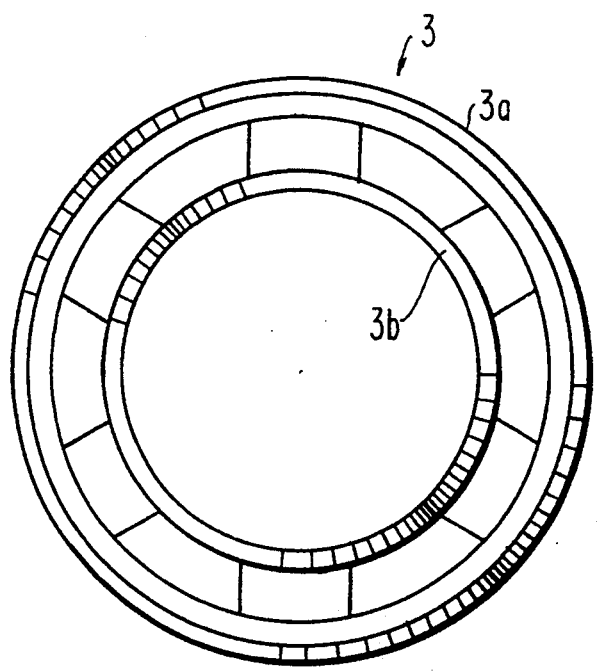
FIGS. 2a and 2b are an end view and partially sectioned side view of one of the input elements of the inventive mechanical tensioner.
Figure 2B:
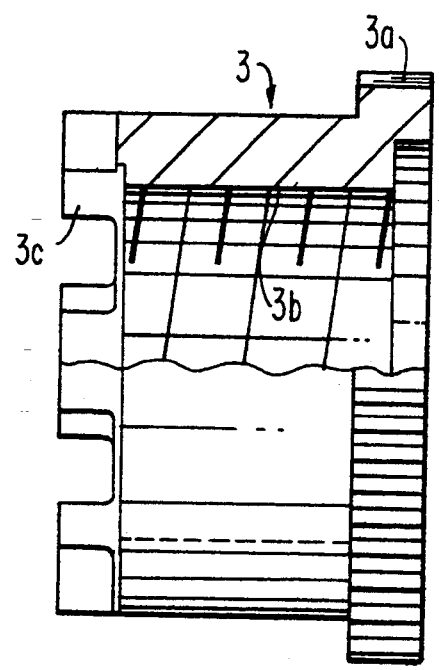
Figure 3:
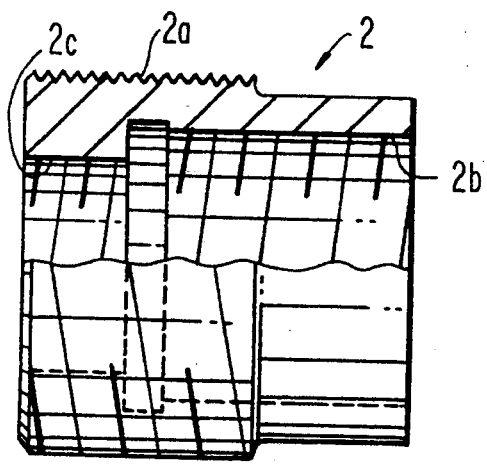
FIG. 3 is a partially sectioned side view of another input element of the inventive mechanical tensioner.
Figure 4:
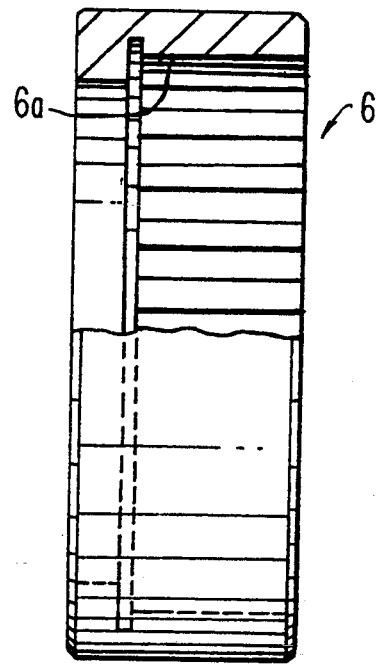
FIG. 4 is a partially sectioned side view of a ring gear of a transmission of the inventive mechanical tensioner.
Figure 5:
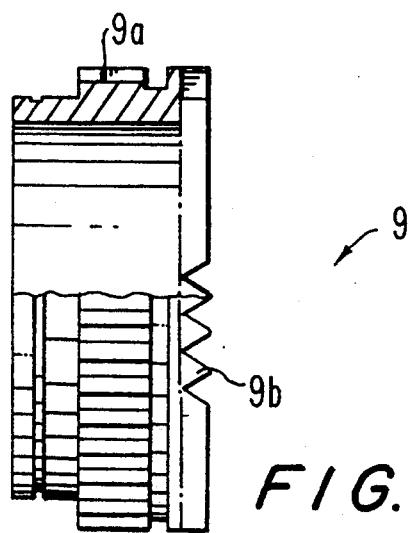
FIG. 5 is a partially sectioned side view of a sun gear of the transmission of the inventive mechanical tensioner.
Figure 6A:
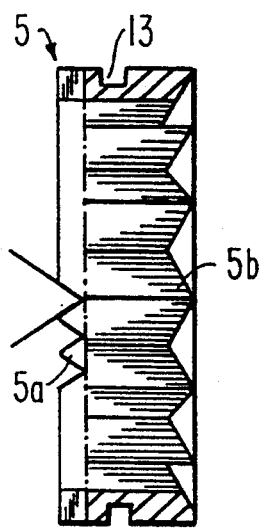
FIGS. 6a and 6b are a sectioned side view and an end view of an output element of the mechanical tensioner.
Figure 6B:
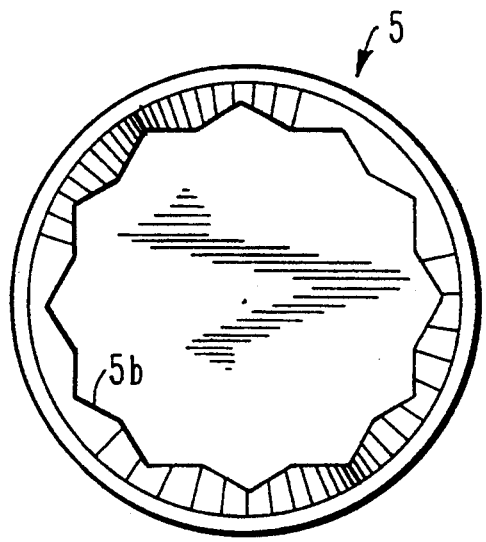
Figure 7A:
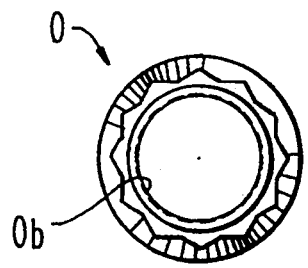
FIGS. 7a and 7b are an end view and a side view of a nut of nut-bolt assembly which is to be tensioned by the inventive mechanical tensioner.
Figure 7B:
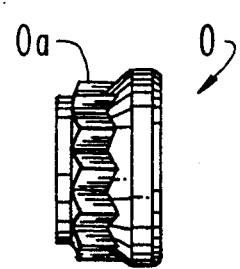
Figure 8:
FIG. 8 is a partially sectioned side view of a washer of the inventive mechanical tensioner.
Figure 9B:
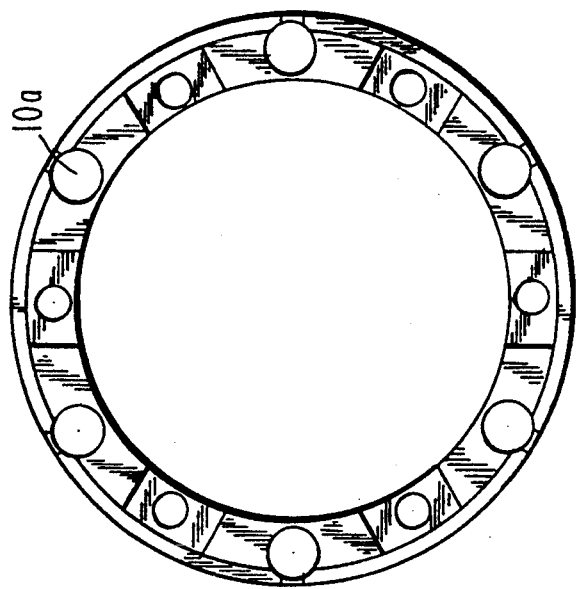
FIGS. 9a and 9b are a sectioned side and an end view of a base ring of the inventive mechanical tensioner.
Figure 9A:
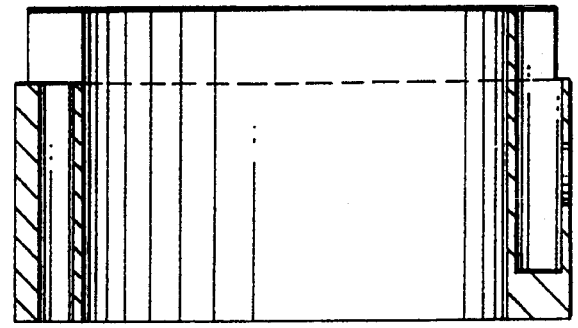

A mechanical tensioner in accordance with the present invention is used for tensioning a nut-bolt assembly which includes a nut 0 and a bolt 1. The nut 0 has an outer thread 0A and an inner thread 0B. The bolt 1 has the outer thread 1A which engages with the inner thread 0B of the nut 0.

The mechanical tensioner has two input elements which are formed as sleeves and identified with reference numerals 2 and 3. The first input element 2 has an outer thread 2A and an inner thread 2B which engages with the outer thread 1A of the bolt 1. The first input element 2 also has engaging formations 2C which are engageable with an actuating tool. The second input element 3 has an outer teeth 3A and an inner thread 3B which engages with the outer thread 2A of the first input element 2 and also engaging formations 3C engageable by an actuating tool. The threads 2A–3B and 2B–1A are threads extending in different directions or in other words a right thread and a left thread or vice versa.

The input element 3 abuts with its bottom face against a hard washer 4. The mechanical tensioner further has an output element which is formed as a ring and identified with reference numeral 5. The output element 5 has facial teeth 5A and inner teeth 5B. The inner teeth 5B of the output element 5 engage with the outer teeth 0A of the nut 0. The input element 3 is operatively connected with the output element 5 through a transmission which will be described in detail later on.

The transmission includes a ring gear 6 which has inner splines or teeth 6A engaging with the outer splines 3A of the input element 3. It further includes a plurality of pins 7 provided with a plurality of gears 8 with outer teeth 8A engaging with the inner teeth 6A of the ring gear 6. The transmission further includes a sun gear 9 provided with outer teeth 9A which engages with the outer teeth 8A of the gears 8. The sun gear 9 also has facial teeth 9B which engages with the facial teeth 5A of the output element 5. The transmission is formed as a speed increasing transmission. In other words, the speed of the output element 5 is higher than the speed of the input element 3 which is connected with the output element 5 through the transmission. For example the number of teeth in the engagement 3A-6A can be 90, while the number of teeth in the engagement 8A-9A can be 72.

The pins are arranged in openings 10a of abase ring 10 at equal distances from one another, and springs 11 are located in the openings. Fixed catches 12 extend over the springs 11 and engage in a groove 13 provided in the outer surface of the output element 5.

The mechanical tensioner in accordance with the present invention operates in the following manner:

The tensioner is arranged on the nut-bolt assembly, and a not shown actuating tool, for example a hydraulic tool, actuates the tensioner. In particular, the tool engages the engaging formations 2C and 3C of the input elements 2 and 3 and turns them in opposite direction with equal forces. Since the input element 2 is provided with two threads, while the input element 3 has only one thread, the friction of the input element 3 is lower and therefore the input element 2 remains stationary, while the input element 3 turns. Under the action of turning of the input element 3, the input element 2 displaces axially upwardly in the drawing and pulls upwardly the end of the bolt 1. On the other hand, the turning of the input element 3 is transmitted to the output element 5 through the above described transmission, and the output element 5 turns the nut 0 so that it pushes against a flange. The output element 5 and the nut 0 together with it turns with a significantly higher speed than the input element 3 and therefore a high degree of tensioning is obtained. During the operation of the transmission, the over-riding is permitted by the power train to prevent damage to the transmission in view of the different number of teeth in the engagements 3A-6A and 8A-9A when the force which is to be transmitted the sun gear 9 to the output element 5 overcomes the force of the springs 11, the teeth 9B slip over the teeth 5A without transmitting a torque.

While in the shown embodiment the mechanical tensioner is applied to the nut-bolt assembly, however it can be used with an assembly any other two threaded members engaged with one another as well.

It will be understood that each of the elements described above, or two or more together, may also find a useful application in other types of constructions differing from the types described above.

While the invention has been illustrated and described as embodied in a mechanical tensioner, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A mechanical tensioner for a nut-bolt assembly, comprising first and second input elements engaging with one another and engageable by an actuating tool, at least one of said input elements having first engaging means engageable by the actuating tool, said first and second input elements having second engaging means engageable with one another, said first and second engaging means being formed so that when said one input element is turned by the actuating tool said input elements are turnable relative to one another in opposite directions, said first input element having third engaging means engageable with a bolt and formed so that when said input elements are turned relative to one another said first engaging element pulls the bolt in an axial direction; an output element having fourth engaging means engageable with a nut so as to turn said nut; and a transmission connecting said second input element with said output element so that when said second input element is turned said output element is turned through said transmission and thereby turns the nut, said transmission having transmission members which are formed and connected with one another so that said output element is turnable with a speed which is substantially greater than a speed of turning of said second input element.

2. A mechanical tensioner as defined in claim 1, wherein said transmission is formed as a planetary gear transmission.

3. A mechanical tensioner as defined in claim 1, wherein said transmission members include a ring gear outwardly engaging said second input element, a plurality of intermediate gears inwardly engaging said ring gear, and a sun gear inwardly engaging said intermediate gears and also engaging said output element.

4. A mechanical tensioner as defined in claim 1, wherein said transmission includes overriding means for periodically interrupting and establishing a connection between said second input element and said output element.

5. A mechanical tensioner as defined in claim 3, wherein said transmission includes overriding means for periodically interrupting and establishing a connection between said second input element and said output element, said overriding means including spring means biasing said output element axially toward said sun gear, so that when during the operation a force of the spring is overcome, engaging elements of the sun gear slip over engaging elements of said output element and do not transmit turning from said sun gear of said transmission to said output element.

* * * * *